July 12, 1932.  C. E. MAYNARD  1,867,369
AUTOMATIC VULCANIZING MOLD
Filed Feb. 23, 1928  5 Sheets-Sheet 2

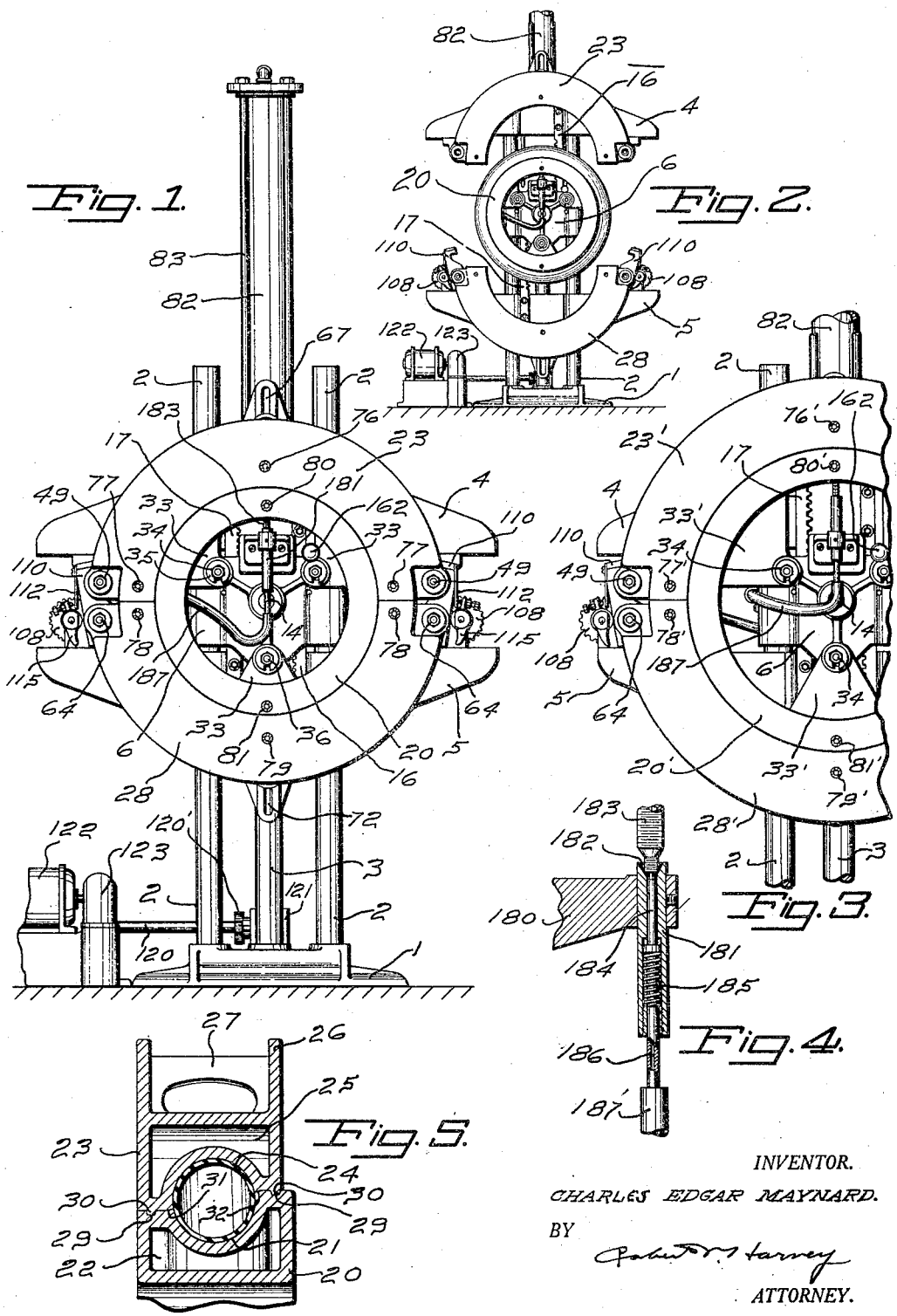

INVENTOR.
CHARLES EDGAR MAYNARD.
BY
*[signature]*
ATTORNEY.

July 12, 1932. C. E. MAYNARD 1,867,369
AUTOMATIC VULCANIZING MOLD
Filed Feb. 23, 1928 5 Sheets-Sheet 3

INVENTOR.
CHARLES EDGAR MAYNARD.
BY
John T. Harvey
ATTORNEY.

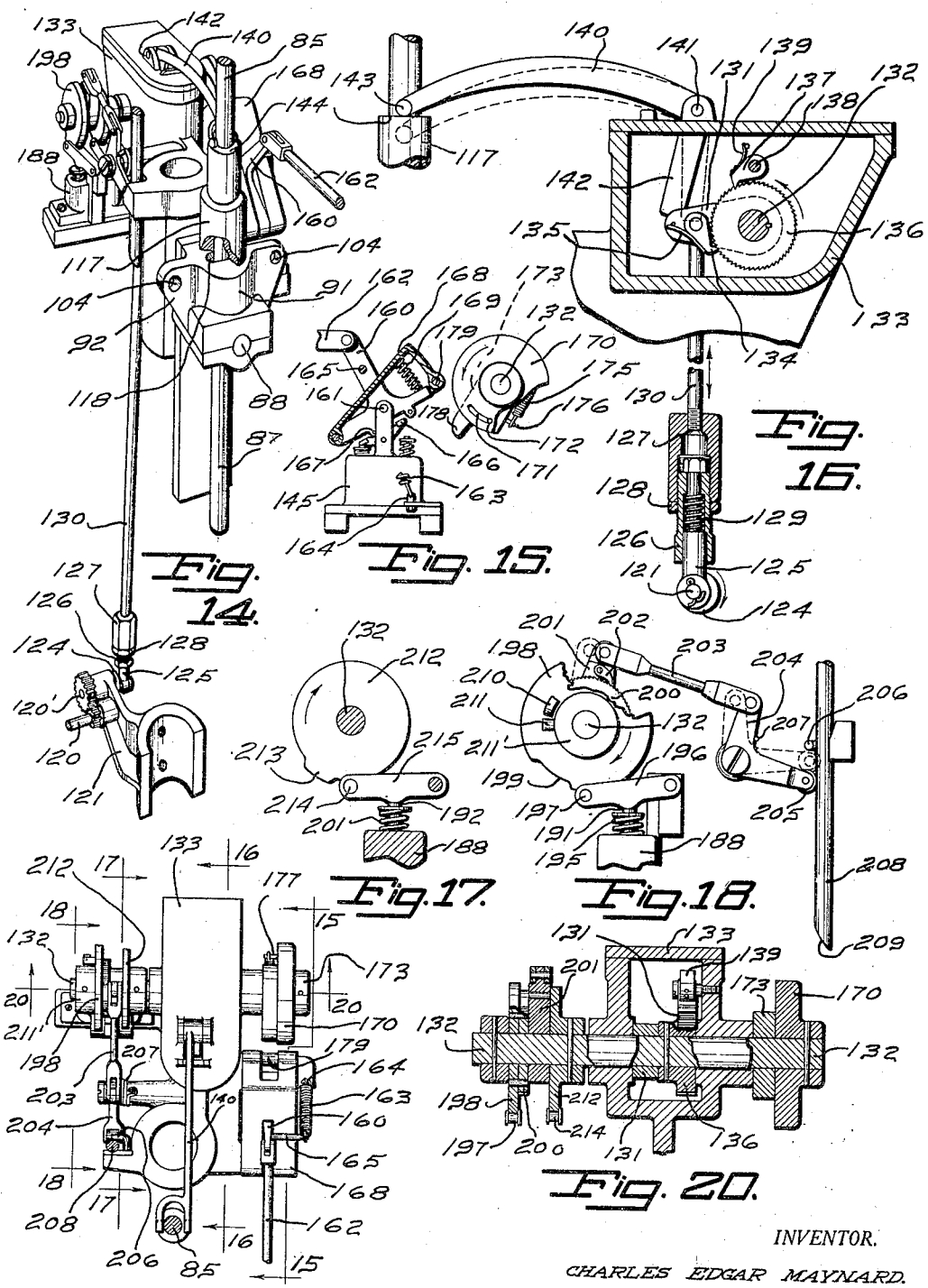

July 12, 1932.　　　　C. E. MAYNARD　　　　1,867,369
AUTOMATIC VULCANIZING MOLD
Filed Feb. 23, 1928　　　5 Sheets-Sheet 5

INVENTOR.
CHARLES EDGAR MAYNARD.
BY
ATTORNEY.

Patented July 12, 1932

1,867,369

UNITED STATES PATENT OFFICE

CHARLES EDGAR MAYNARD, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

AUTOMATIC VULCANIZING MOLD

Application filed February 23, 1928. Serial No. 256,078.

My invention relates to molds used in the manufacture of rubber goods, particularly molds adapted for the vulcanization of annular rubber tubes such as inner tubes for pneumatic tire casings. The mold of the present invention is an improvement on those shown in my prior applications Serial Nos. 210,295, filed August 3, 1927, and 228,175, filed October 24, 1927. The object of my invention is to provide a mold that will perform its sequence of vulcanizing operations automatically when started by the operator, which will be simple in construction, rapid in operation, and economical to build and maintain. Specifically the invention relates to the simplification of the mechanism shown in my prior applications cited above and to the improvement of the control mechanism.

Referring to the drawings,

Fig. 1 is a front elevation of my improved mold, showing the parts in the position they occupy during the vulcanization of the tube;

Fig. 2 is a similar view on a smaller scale, showing the mold open;

Fig. 3 is a detail corresponding to Fig. 1 illustrating the application of a mold of larger size to the same operating mechanism;

Fig. 4 is a detail of an air connection;

Fig. 5 is a section through the closed mold;

Fig. 6 is a side elevation of the mold shown in Fig. 1;

Fig. 7 is an enlarged detail thereof, partly broken away;

Fig. 8 is a plan, partly broken away, of the frame carrying the central mold section;

Fig. 9 is a section on line 9—9 of Fig. 8;

Fig. 10 is a detail of certain parts shown in Fig. 7, but in the position they assume when the mold is open;

Fig. 14 is a perspective view of the automatic control mechanism;

Fig. 15 is a detail of the control mechanism for the mold opening and closing valve taken on line 15—15 of Fig. 19;

Fig. 16 is a section on line 16—16 of Fig. 19;

Fig. 17 is a section on line 17—17 of Fig. 19, showing the air exhausting valve for the tube;

Fig. 18 is a section on line 18—18 of Fig. 19, showing the air admitting valve for the tube;

Fig. 19 is a plan view of the parts shown in Fig. 14;

Fig. 20 is a section on line 20—20 of Fig. 19;

Figure 11:
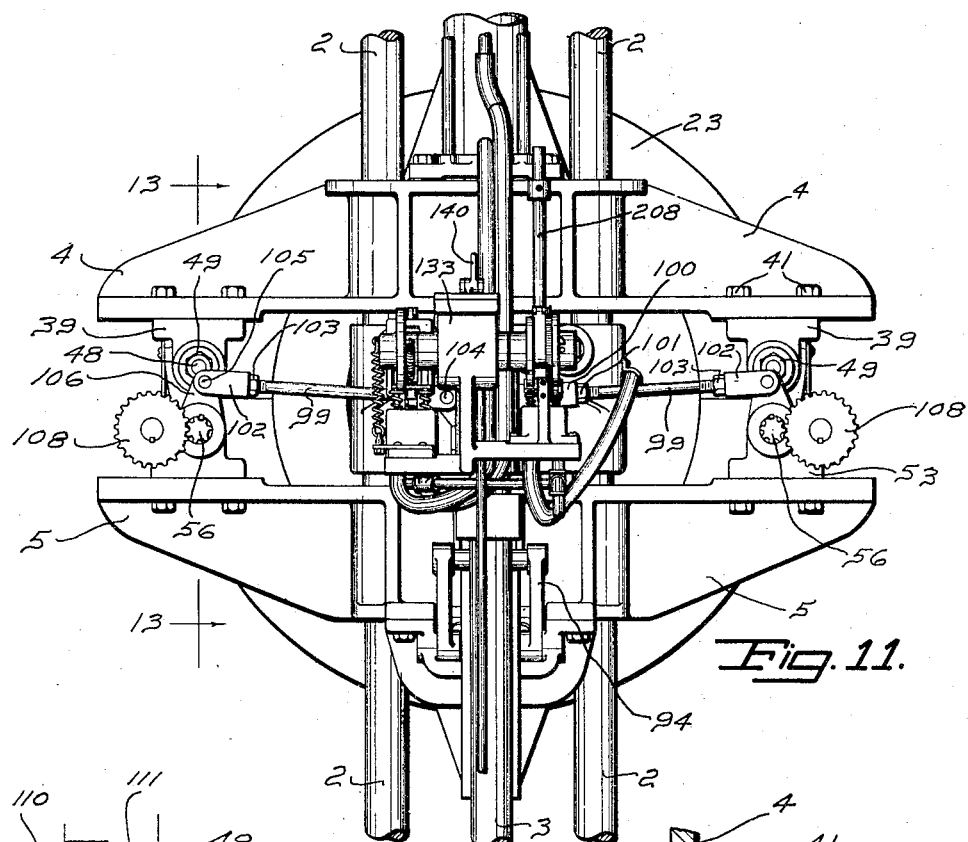
Fig. 11 is a back view of the mold shown in Fig. 1.

The vulcanizing mold and its operating parts are mounted on a base 1 from which arise a pair of posts 2 and a third post 3 of lesser height than and offset from the first two. Upper and lower slides 4 and 5 respectively, which carry the movable sections of the mold in a manner to be described, are slidably mounted upon the posts 2. Embracing all three of the posts is a fixed frame 6, which carries the central stationary part of the mold. This frame seats upon a shoulder 7 formed by a turned down end of the post 3 (Fig. 7) and is held in place by a nut 8 and a collar 9 upon a threaded portion of the post. Besides this attachment the frame is also held firmly to the posts 2. Holes 10, (Fig. 8) drilled horizontally through the frame, receive pairs of rods 11 and 12, the abutting ends of each pair being shaped to fit the side of a post 2. Bolts 13, passing freely through holes in the rods 11 and threaded into the rods 12, draw the rods together and clamp the frame firmly to the posts.

The upper and lower slides 4 and 5 are connected together by an equalizing arrangement which causes them to move synchronously in opposite directions towards or away from the central frame. A stud 14 (Fig. 9) on the frame 6 carries a pinion 15 which meshes simultaneously with opposite racks 16 and 17 connected respectively to the upper and lower heads as seen in Fig. 2. At points opposite the engagement of the racks with the common pinion they are supported by rollers 18 mounted upon pins 19 in the frame, so that binding of the parts is prevented.

The mold is composed of a central circular section, and two semi-circular ring members fitting about the central section to form a complete annular molding cavity. The central section 20 (Fig. 5) is provided with a cavity 21 around its outer surface, and is chambered at 22 for the circulation of steam. The upper section 23 is provided with a cavity 24 around its inner periphery, and is chambered at 25 for the circulation of steam. Flanges 26 and cross ribs 27 are provided to give added rigidity to the outer sections. The lower section 28 is a substantial duplicate of the upper section, and its construction has therefore not been illustrated in detail. To insure accurate alignment as the mold closes the central section is provided with peripheral grooves 29 and the outer sections with registering ribs 30. The front and back parting lines 31 and 32 of the mold sections are preferably located diametrically opposite each other, but with the front parting line of lesser diameter than the back one.

The central mold section is mounted upon the frame 6, and the upper and lower sections upon the slides 4 and 5 respectively, in a manner permitting them to be removed readily for replacement by a different sized mold. This is of importance in adapting a large installation of vulcanizing units to fluctuations in the demand for goods of different sizes, and I believe my vulcanizing unit to be of especial utility by reason of the readiness with which such changes in size may be made. The central section is provided with three inwardly extending lugs 33, two of which are apertured to receive the threaded ends of rods 12. Nuts 34 and washers 35 hold the section firmly to the ends of the rods. A rod 36, extending through the frame and clamped thereto by a nut 37 (Fig. 9) passes through the third lug, which is clamped likewise by a nut 34 and a collar 35.

Figures 12, 13:
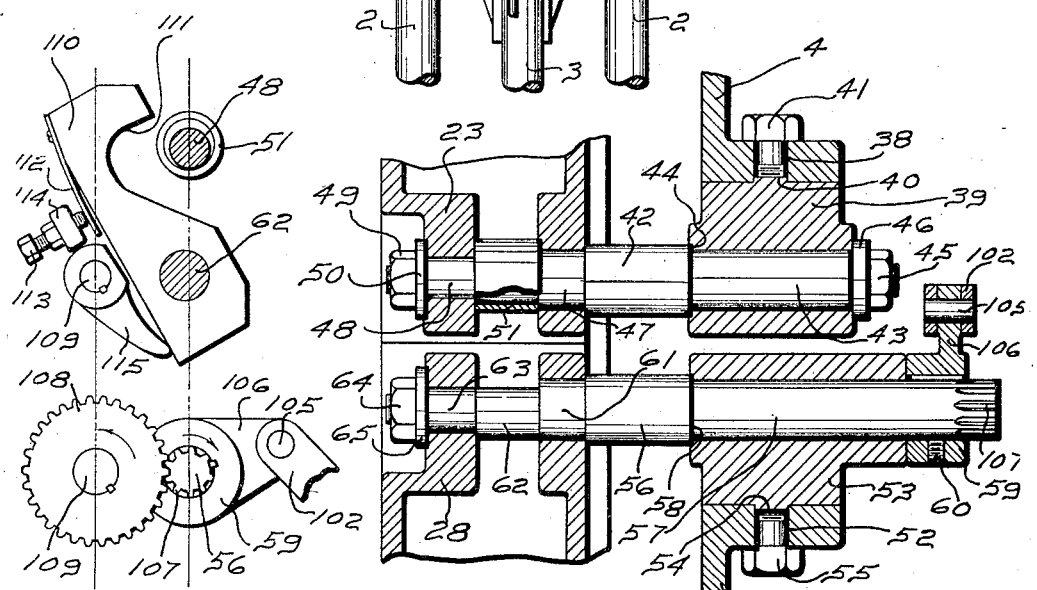
Fig. 12 is a detail of parts shown in Fig. 11, taken on a larger scale and with certain parts broken away, and showing the members in the positions occupied when the mold is open.
Fig. 13 is a section on line 13—13 of Fig. 11.

The rods 12 and 36 are fixed, and the changes in dimensions necessary in converting from one size of mold to another are met by changing the dimensions of the lugs 33. In the case of the outer sections, however, it is necessary to make the attaching means adjustable on the slides 4 and 5. The upper section will be considered first. Slide 4 is shaped in general like a rather flat triangle (Fig. 11) and in each of its sidewardly extending portions is formed a slot 38 (Fig. 13).

Slides 39 are formed with ribs 40 extending into these slots to serve as guides, and studs 41, passing through the slots, fasten the slides in the desired adjusted position. Each slide is provided with a rod 42, reduced at one end to pass through the slide so as to form a shoulder 44, and held tightly in the slide by a nut 45 and a washer 46. The other end of each rod is reduced at 47 and again at 48, these portions passing through the two flanges of the upper mold section, and is provided with a nut 49 and a washer 50 to clamp the mold section in place. A freely rotating sleeve 51 is mouted on an eccentric portion intermediate portions 47 and 48 lying between the flanges of the mold for a purpose which will appear below.

The sidewardly extending portions of the lower slide 5 are likewise slotted at 52, the slides 53 with ribs 54 are secured in place by studs 55 as with the upper slide. Instead of a fixed rod, however, each of the slides 53 carries a rotatable shaft 56 reduced at 57 to form a shoulder 58 and held in place by a crank hub 59 bearing a set screw 60. The other end of shaft 56 is formed with a reduced portion 61 passing freely through one flange of the lower mold section, an eccentric portion 62, and a concentric reduced portion 63 passing freely through the second flange. A nut 64 and a washer 65 hold the lower mold section firmly in place on the shaft. A bolt 66 (Fig. 6) is held in an adjusting slot 67 (Fig. 1) in the upper slide 4 by a nut 68 (Fig 6), and the upper mold section is held to it by a nut 69 and a washer 70. Similarly, a bolt 71 is held in an adjusting slot 72 in the lower slide 5 by a nut 73, and the lower mold section is attached to it by a nut 74 and a washer 75.

In order to remove the mold sections from the operating unit for replacement with others of a different size it is only necessary to loosen the nuts 34, 49, 64, 69 and 74, whereupon the mold sections can be slipped off either separately or as a unit. It is preferable to clamp the two outer sections of the mold together at their ends, thus binding them firmly upon the central section. If this is done the mold can be handled and stored as a single piece. In this event the steam connections joining the mold sections (to be described below) are preferably left intact, only the connections to the source of steam and to the exhaust being broken. When the mold has been removed from the operating unit a different sized mold can be applied by the reverese operation. In Fig. 3 I have shown the application of a different sized mold, with the mold parts indicated by primed numerals. The central section is first attached, and then slides 39 and 53, and bolts 66 and 71, are adjusted in position until they correctly align with the holes in the outer mold sections. Tight adjustment of the locking mechanism may be secured by rotating shafts 42, the eccentric mounting of rolls 51 moving them towards or away from shaft 56 to secure the desired spacing.

The steam connections have not been shown in detail, as they would obscure other parts and are themselves obvious. The general arrangement of parts is shown in Fig. 1. The upper section has an inlet 76 and a pair of outlets 77. The lower section has a pair of inlets 78 and an outlet 79. Flexible hose or an extensible pipe joins each outlet 77 with a corresponding inlet 78 so that the steam circulates through the two outer sections in succession. The inner section is provided with an inlet 80 and an outlet 81. Connection is made to a suitable steam supply so that the mold sections, whether assembled or separated, are always kept heated to the desired temperature for vulcanization.

In the present mold a single pneumatic cylinder is used to open or close the mold and to operate the mold locking mechanism. This cylinder 82 is held down to the upper slide 4 by tie rods 83 and operates as an integral part of this slide. Running in the cylinder is a piston 84 attached to a rod 85. This rod has a reduced and threaded portion 86 and a further reduced portion 87. Threaded on the portion 86 is a wrist pin 88 held in place by a lock nut 89 which as will later be pointed out serves as a bumper or thrust block. The reduced portion 87 of the piston rod passes freely through a bearing in a bracket 90 secured to the lower slide 5, thus steadying the rod. The lock nut 89 which holds the wrist pin in place strikes against the bracket 90 after a period of free movement from the position of Fig. 7 during which the locking mechanism is released. At the same time a rocking member 91, having sidewardly projecting ears 92 and bearing a downwardly extending cam plate 93, strikes against a bell crank lever 94 pivoted at 95 to the bracket and bearing against an adjusting screw 96. The upper end of this lever carries a cam roll 96′ which coacts with cam plate 93 movable with the piston rod, and with a cam plate 97 and cam hooks 98 stationarily mounted on the post 3. Before considering the purpose and operation of these parts it will be convenient to examine the mechanism for locking and unlocking the mold sections.

Links 99, (Fig. 11) which extend from the member 91 to the locking mechanism at either side of the mold, are threaded at their inner ends into yokes 100 to which they are held by lock nuts 101, and at their outer ends into yokes 102 to which they are held by lock nuts 103. Preferably the threads at the two ends of each link are respectively right and left handed so that the spacing between the yokes may be varied as desired. Yokes 100 are pivoted at 104 to the member 91, and yokes 102 are pivoted at 105 to cranks 106 forming part of the hubs 59 on the end of shafts 56 (Fig. 13). As the member 91 is moved up or down by the travel of the piston rod the links are shifted from the position of Fig. 11 to that of Fig. 12, rocking the cranks 106 and rotating the shafts 56. The end of each shaft 56 is formed as a pinion 107 which meshes with a gear 108 keyed to a short shaft journaled in slide 53 adjacent the shaft 56. A latch 110, having a hook portion 111 adapted to fit over the sleeve 51 mounted on the rod 42, is freely mounted upon the eccentric portion 62 of each shaft 56. When the mold is closed the latches are held over the sleeves by the action of a leaf spring 112 secured to each latch and tensioned against a set screw 113 attached to a bracket 114 on the corresponding slide 53. When the mold is to be opened, however, the latches are tilted as shown in Fig. 12 by finger cams 115 keyed to shafts 109 upon which are mounted the gears 108.

A description of the action of the mold actuating and locking mechanism may now be given. Fig. 7 shows the position of the piston and associated parts when the mold is closed. As the piston starts to descend no effect is produced at first upon the mold sections. During the travel of the member 91 from the position of Fig. 7 down to where it strikes the lever 94 its action is entirely upon the locking means, due to the rotation of cranks 106 caused by the shifting position of links 99. As the cranks turn the eccentrics 62 first raise the latches 110 slightly so that they release the sleeves 51. Then, by the interaction of pinions 107 with gears 108, the finger cams 115 are pressed against the lower portion of the latches to swing the latter into the position of Fig. 12, in which the two outer mold halves are completely released from each other and are free to be separated by the further travel of the piston.

As the piston descends the cam plate 93 is lowered until its upper end passes the roll 96′ on the upper end of the lever 94. At substantially the same instant the lower part of member 91 strikes the lower arm of lever 94, swinging it positively to the position of Fig. 10, and the lock nut 89 strikes the surface of bracket 90. When this occurs the action of the pneumatic cylinder is exerted directly on slides 4 and 5 to separate them, the cylinder being attached to slide 4 and the piston rod to slide 5. Motion continues until the piston has reached the limit of its travel, when the outer mold sections will be separated as shown in Fig. 2. During the movement of separation of the slides the roll 96′ is guided by the surface of cam plate 97, and rests upon the top of cam plate 93.

After a fresh tube has been placed in the vulcanizer a reverse sequence takes place to close and lock the mold sections. The parts are now in the position of Fig. 10. Air being admitted under the piston 84 the latter is raised, carrying member 91 and cam plate 93 with it. Since the roll 96' is resting upon the top of cam plate 93, being held there by cam plate 97, the lever 94, and consequently the slide 5 to which it is attached through bracket 90, will be raised. The reaction of the air pressure against the cylinder 82 will at the same time force slide 4 down, the two slides being constrained for simultaneous and equal movement by the equalizing rack and pinion mechanism. At the time when the mold sections just close, roll 96' has passed the end of plate 97 and is deflected by cam hooks 98, tilting the lever and removing the roll from the path of plate 93. This allows the member 91 to continue its upward movement, during which the locking mechanism is actuated, without restraint by the now abutting mold members.

The action of the locking mechanism is the exact reverse of the unlocking operation previously described. The finger cams 115 first release the latches so that the latter are swung over sleeves 51 by the action of the springs 112. The eccentrics 62 are of course constantly turning, but their action is by nature so slow that the latches have ample time to close before they are drawn down by the eccentrics. As the eccentrics come into locking position their centers shift so that they are about in line with the centers of shafts 56 and 48, a condition which gives both a maximum force acting to close the molds and a minimum of displacement of the latch for a unit angular displacement of the shaft 56. The latter feature is of use in that it renders the stopping point of the locking movement of the piston not at all critical, a small variance in the travel of the piston producing no appreciable effect on the locking of the mold. The motion of the piston is finally stopped by the striking of the shoulder 116, formed on a collar 117 on the piston rod, against the under side of the stationary frame 6. In order to accommodate small variations in the action of the locking mechanism at the two sides of the mold the member 91 is pivoted to the piston rod by the wrist pin 88 previously described, and has its rod-receiving hole formed on a taper, as shown at 118 in Fig. 14, so as to permit a slight sideways equalizing motion.

The mold is arranged to unlock and open automatically at the end of a predetermined time after it is closed by the operator. The control mechanism is mounted on the rear of the mold, and is operated from a shaft 120 mounted in a suitable journal 121 and driven at a constant speed by a motor 122 through a reduction gearing 123. Connected to the shaft 120 by replaceable gearing 120' is a crank 124 to which is pivoted a rod 125 slidably fitted in a sleeve 126. The sleeve is screwed into a cylinder 127 in adjusted position by a lock nut 128. A spring 129 is compressed between a shoulder on the sleeve and a shoulder on the rod, so that the crank and rod may be moved even though the sleeve and cylinder are held stationary. Screwed into the top of the cylinder 127 is a rod 130, secured pivotally at its upper end to a pawl carrier 131 swinging freely upon a shaft 132 which is journaled in a casing 133 mounted upon the stationary post 3. The pawl carrier 131 carries a pawl 134 pressed by a spring 135 against a ratchet 136 keyed to shaft 132. A detent 137, pivoted upon a stub shaft 138 in the casing 133, is pressed by a spring 139 against the ratchet to prevent retrograde motion. A rocker 140 is pivoted at 141 to the casing, and bears a depending arm 142 adapted to clear the rod 130 when in the full line position of Fig. 16 and to prevent its upward movement when in the dotted line position. The end of the rocker remote from the casing is formed as a yoke 143 overlying a shoulder 144 on the collar 117.

As mentioned above, the shaft 120 is constantly rotated, giving a steady up and down motion to the rod 125. If the piston 84 is in its uppermost position, in which it is when the mold is closed, the rocker 140 will be in the full line position of Fig. 16, and the rod 130 is free to move vertically following the movements of rod 125 and to oscillate the pawl carrier 131. During the time when the mold is closed, therefore, the shaft 132 is given a step by step motion in the direction of the arrow in Fig. 16. When the piston 84 is lowered to open the mold the rocker 140 is shifted to the dotted line position in which its arm 142 blocks upward movement of rod 130. This causes the shaft 132 to remain stationary during the entire period—which is entirely under the control of the operator—when the mold is open for the removal of a finished tube and the insertion of a fresh one to be vulcanized. The control devices for admitting or releasing the internal pressure from the tube and for opening the mold are actuated in a predetermined sequence during the period when the mold is closed.

Figure 22:
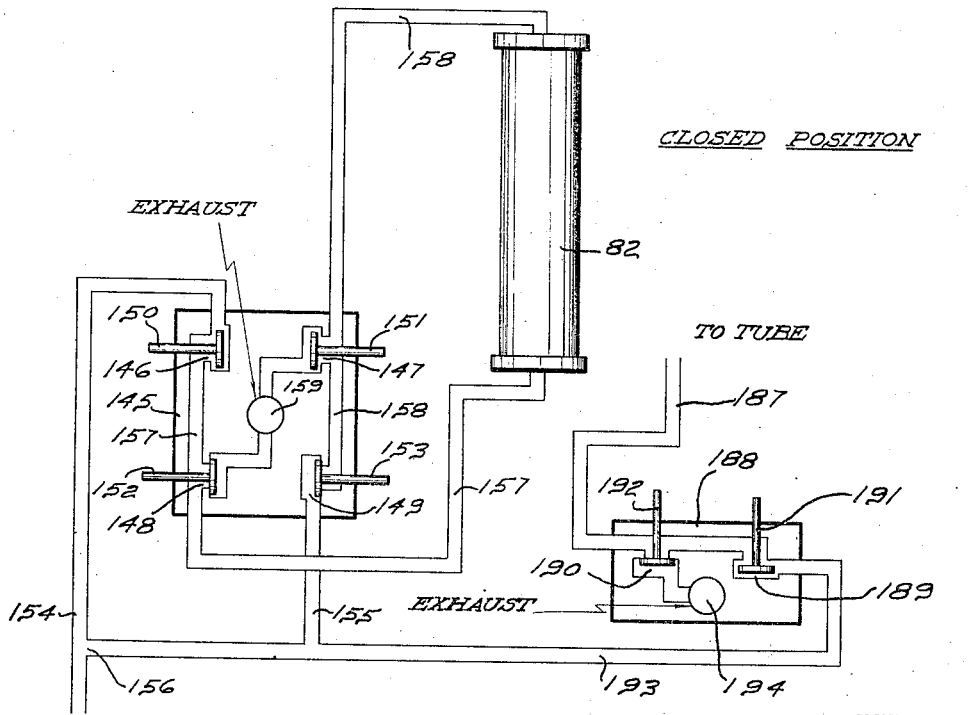
Fig. 22 is a diagrammatic layout of the air connections.

Admission of air to the two ends of the cylinder 82 is accomplished through a valve 145, (Figs. 15 and 22) having ports 146, 147, 148, and 149 arranged to be opened and closed by alternately operated pairs of spring-pressed plungers 150 and 151, and 152 and 153. A pipe 154 joins port 146, and a pipe 155 the port 149, to the air line 156. A pipe 157 joins ports 146 and 148 with the lower end of the cylinder 82, and a pipe 158 joins ports 147 and 149 with its upper end. The valve is of a usual commercial type unnecessary to describe in detail, operated by a rocker 160 pivoted at 161 to the valve frame and provided with a handle 162 extending to the front of the machine. A spring 163 is tensioned between a pin 164 on the frame and a pin 165 on the rocker, the line of the spring being so chosen that it lies alternately on one side or the other of the pivot 161. The valve is thus held by the spring in either extreme position until positively moved towards the other, and snaps into place by the spring action. The plungers on the valve are contacted with by an intermediate rocker 166 actuated by projections 167 on the rocker 160, in order to keep the pressure on the valve plungers more in line with their axes.

The handle 162 enables the operator to actuate valve 145 to admit air to the bottom of the cylinder and vent the top to the exhaust 159. Opening of the mold is brought about a predetermined time after the mold has closed, by mechanism associated with shaft 132. A hood 168 extends over the valve and is constantly urged upwardly by a spring 169 compressed between the hood and one end of the rocker 160. Keyed to shaft 132 adjacent this hood is a disk 170 (Figs. 15 and 20) having an arcuate slot 171 therein into which projects a pin 172 on a segment 173 loosely mounted on the shaft. A spring 175 is stretched between a pin 176 on the segment and a pin 177 (Fig. 19) on the disk, so that the segment is always urged relative to the disk into the position shown in Fig 15. A finger 178 on the segment coacts with a roll 179 on the hood in a manner which will now be described.

As the rocker 160 is tilted into the position of Fig. 15 by the operator pulling handle 162 the piston is caused to rise, closing and locking the mold and causing collar 117 to tilt rocker 140 into the full line position of Fig. 16. The rod 130 is thus released for vertical reciprocation and shaft 132, carrying disk 170, begins its step by step rotation. After the period predetermined as the desired period for vulcanization, which can be varied by changing the speed of shaft 120, or by the replaceable gearing 120', finger 178 strikes roll 179. Spring 175 is made weaker than spring 169 so that finger 178 remains stationary in contact with the roller until pin 172 has reached the end of slot 171. Thereupon the spring 169 is compressed until it has acquired sufficient force to overcome spring 163 and snap the rocker 160 over to its opposite position, in which air is admitted to the top of the cylinder 82, causing the mold sections to be unlocked and opened. Shaft 132 now stops, due to the swinging of rocker 140 to the dotted line position of Fig. 16, and finger 178 snaps past roll 179 to approximately the position in which it is shown in Fig. 15. The purpose of the spring mounting of the finger is to cause it to clear roll 179 as soon as it has done its work, and thus present no obstruction to the swinging of the rocker to the position of Fig. 15 by the operator pulling handle 162 when he again wishes to close the mold.

The automatic control is also arranged so that it will admit air to the interior of the tube being vulcanized and vent it therefrom in predetermined timed relation to the closing and opening of the mold. Upon a bracket 180 (Fig. 4) secured to the fixed frame 6 is a housing 181 having a conical seat 182 for centralizing the tube valve stem 183. Sliding in the housing is a plunger 184 constantly urged upwards by a spring 185 and having a pointed top entering into the end of the valve stem. An opening 186 extends the entire length of the plunger, so that the interior of the valve stem is kept in communication with a tube 187 which joins the plunger to the pressure supply and control devices. When a tube is placed in the mold for vulcanization its valve stem is projected through a radial hole in the central circular mold section, and centers in the conical seat 182. The conical tip of plunger 184 enters the end of the valve stem, and adjusts itself by compression of the spring 185 so that a tight seal is obtained. Usually in the vulcanization of tubes in circular molds the valve stem is held in the tube merely by the elasticity of the rubber around the hole, the clamp nut which binds the valve stem to the tube in the finished article not having been applied at this stage of manufacture. The absence of any rigid bond permits the valve stem to slip relative to the tube, and to adjust itself to position even if its length is not quite standard. The internal pressure supplied to the tube during vulcanization presses the valve stem outwardly of the mold into tight engagement with seat 182 and plunger 184, and also presses the tube rubber tightly against the mold and valve stem, avoiding leaks at this point, housing 181, however, being so adjusted in bracket 180 that spring 185 keeps the flange on the inner end of the valve stem just out of contact with the inner surface of the tube, preventing thinning of the tube at this point.

The tube 187 connects the valve stem with an air control valve 188 (Figs. 18 and 22) of a standard type, having ports 189 and 190 normally closed by spring-pressed plungers 191 and 192. Port 189 is connected by a pipe 193 to the main air line 156, while port 190 is connected to an exhaust 194. The spring 195 acting on plunger 191 holds it against a lever 196, pivoted to a stationary part and bearing at its free end a cam roll 197 riding on a surface cam 198. The periphery of this cam is cylindrical except for a cut-away portion 199 which, when it passes over the cam roll, allows the plunger 191 to rise and shuts off the supply of air to the interior of the tube. As the shaft 132 is stationary except when vulcanization is in progress, the major part of the cam surface is devoted to keeping up the supply of air pressure in the tube.

It is desirable to admit air to the interior of the tube while the mold is in process of closing, in order to reduce as much as possible the time in which the rubber is in uninflated contact with the hot mold surfaces. This is particularly desirable if the tube is folded transversely before being stretched around the central circular mold section as is described in the application of M. J. Blake, Serial No. 236,945, filed December 1, 1927. Too great delay in the inflation of the tube results in softening of the rubber by heat and consequent uneven stretching, and too early inflation stretches the tube so that it extends between the mating edges of the mold sections before these are brought together, where it will be cut and ruined. Accurate control of the amount of pre-inflation and automatic synchronization of this with the closing of the mold, is therefore necessary.

In the present mold I have provided mechanism for initiating the inflation of the tube during the closing of the mold. To this end the cam 198 is loosely mounted on shaft 132, and is pinned to a loosely mounted ratchet 200 at its side. A pawl carrier 201, bearing a pawl 202, is freely mounted on shaft 132 and is joined by a link 203 to one arm of a bell crank 204 pivoted to a fixed part of the machine. A cam roll 205 is mounted on the other arm of the bell crank and is yieldably held against stop 206 by spring 207. The roll bears against a rod 208 having a tapered cam end 209 and secured adjustably in the upper slide 4. When the slide descends in the closing of the mold the cam 209 strikes the roll 205, rotates the bell crank to the full line position of Fig. 18, and moves the ratchet and cam clockwise as viewed in that figure a sufficient distance to raise roll 197 onto the main cylindrical portion of the cam. This of course admits air to the inside of the tube through the valve mechanism previously described. Cam 198, being free on the shaft, remains stationary during the first part of the latter's rotation, being connected to it later by engagement of a projection 210 on the cam with a pin 211 extending from a collar 211' pinned to the shaft.

Figure 21:
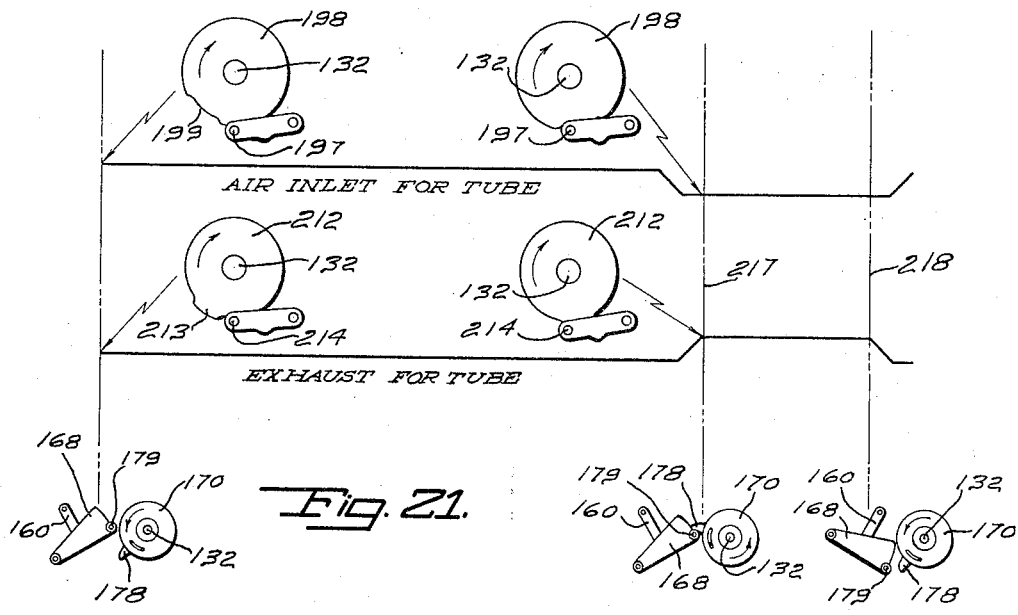
Fig. 21 is a diagrammatic cam chart.

During the time when the air line is not connected with the interior of the tube the latter is vented to the atmosphere by the depression of plunger 192 which opens port 190 in valve 188. This plunger is controlled by a cam 212 fixed to shaft 132 and bearing a projection 213 coacting with a cam roll 214 on a rocker 215. When the projection bears against the cam roll, which as shown best in Fig. 21 occurs only during the time when roll 197 is riding in the cutaway portion 199 of cam 198, the plunger 192 will be depressed against the action of spring 216 and the port 190 opened.

The operation of the entire machine will now be reviewed in order to get a clearer picture of the coordination of the various elements. Starting with the mold open as in Fig. 2, the operator places a tube, preferably folded transversely, around the central mold section 20, with the valve stem 183 fitting into the connecting device of Fig. 4, and then pulls handle 162. This shifts the rocker 160 and by the valve mechanism associated therewith admits air under the piston 84, which at this time is in its lowermost position. As the piston rises the outer mold sections are drawn together towards the closed position of Fig. 1. At a point in their travel predetermined by the size of the tube, and therefore the amount of pre-inflation necessary, the cam 209 actuate valve 188 to admit air to the tube. By the time the mold sections have closed the tube will be almost inflated, so that a minimum time will be lost in getting the rubber pressed firmly against the mold surfaces. After the mold sections have contacted with each other piston 84 continues its upward movement, locking the molds together as described in detail above. The completion of the upward travel of the piston causes collar 117 to tilt rocker 140, removing the arm 142 of the latter from the upper end of rod 130 and permitting the actuation of pawl 134. Shaft 132 now advances step by step while vulcanization proceeds. After the lapse of the predetermined time for which the machine has been set the supply of air to the interior of the tube is shut off by cam 198 and immediately thereafter (Fig. 21) the cam 212 vents the tube to the atmosphere. After a further lapse of time, indicated by the space between time-lines 217 and 218 in Fig. 21 and sufficient to allow the air to escape from the tube to a point where there is no danger of bursting if the mold sections are removed, the finger 178 trips the rocker 160 and reverses the action of the piston, again unlocking and opening the mold.

Having thus described my invention, I claim:

1. A vulcanizing mold for annular articles comprising a plurality of sections, means for closing the sections, a valve for admitting fluid pressure to the interior of an article in the mold, a cam for controlling said valve, means automatically operable at a predetermined time prior to the closure of the mold to initially move said cam to open the valve and admit fluid pressure to the article and means operative after complete closure of the mold to continue the movement of the cam to maintain the valve open during the period of vulcanization and to close the valve prior to the opening of the mold.

2. A vulcanizing mold for annular articles comprising a plurality of mold sections, mechanism for opening and closing the sections, manually controlled means for setting said mechanism in operation to close the mold, a valve for admitting fluid pressure to the interior of an article in the mold, a cam for controlling said valve, means automatically operable at a predetermined time prior to the closure of the mold to initially move said cam to open the valve and admit fluid pressure to the article, means operative after complete closure of the mold to continue the movement of the cam to maintain the valve open during a predetermined period and to thereafter release the pressure in the article and automatic means to actuate the mold opening mechanism.

3. A vulcanizing mold for annular articles comprising a plurality of sections, means for closing the sections, and locking means comprising an eccentrically mounted hook on one section, a member on another section over which the hook fits, means for swinging the hook automatically to embrace the member upon closure of the mold, and means for rotating the eccentric mounting of the hook to strain the sections together.

4. A vulcanizing mold for annular articles comprising a central circular section, a pair of mating external sections, equalizing mechanism coupling said external sections together for simultaneous movement in opposite directions, a cylinder secured to one external section, a piston fitting in the cylinder and normally secured to the other external section, locking mechanism for joining the external sections together, means disconnecting the piston from its mold section when the external sections have been brought together, and means operated by further travel of the piston for actuating the locking mechanism.

5. A vulcanizing mold for annular articles comprising a central circular section, a pair of mating external sections, equalizing mechanism coupling said external sections together for simultaneous movement in opposite directions, a cylinder secured to one external section, and a piston fitting in said cylinder and secured to the other external section.

CHARLES EDGAR MAYNARD.